United States Patent [19]

Agius-Sinerco

[11] 3,805,567

[45] Apr. 23, 1974

[54] METHOD FOR CRYOGENIC MANDREL EXPANSION

[75] Inventor: Joseph A. Agius-Sinerco, Redwood City, Calif.

[73] Assignee: Raychem Corporation, Menlo Park, Calif.

[22] Filed: Sept. 7, 1971

[21] Appl. No.: 178,332

[52] U.S. Cl........................... 72/42, 29/447, 72/342, 72/364, 72/370, 72/700, 285/DIG. 5, 285/381
[51] Int. Cl........................ B21d 31/04, B21d 37/18
[58] Field of Search............ 29/447; 72/41, 42, 342, 72/364, 370, 700; 75/170; 148/11.5 F; 285/381, DIG. 5, DIG. 10

[56] References Cited
UNITED STATES PATENTS

| | | | |
|---|---|---|---|
| 3,513,429 | 5/1970 | Helsop | 285/381 UX |
| 3,174,851 | 3/1965 | Buehler | 75/170 K |
| 3,653,250 | 4/1972 | Collins | 72/364 |
| 3,078,905 | 2/1963 | Somers et al. | 72/370 |
| 3,127,015 | 3/1964 | Schieren | 72/420 |
| 3,483,047 | 12/1969 | Buchanan et al. | 148/11.5 F |

OTHER PUBLICATIONS

Materials Eng., Oct. 1969, Vol. 70, No. 4, pages 28-31, "What You Can Do With That Memory Alloy".
The Journal of Teflon, Mar.-Apr. 1967, Vol. 8, No. 2, pages 4-7, "Properties of Teflon at Cryogenic Temperatures".
The Journal of Teflon, March 1961, Vol. 2, No. 3, pp. 6 & 7, "Designing with Teflon Resins at Low Themperature".
The Journal of Teflon, May 1961, Vol. 2, No. 5, pp. 3-5, "The How's and Why's of Friction for 'Teflon' Resins".
Polypropylene by H. P. Frank (copyright 1968) published by Gordon & Breach, Scientific Publishers, Inc., pages 58-66.

Primary Examiner—Charles W. Lanham
Assistant Examiner—E. M. Combs
Attorney, Agent, or Firm—Lyon & Lyon

[57] ABSTRACT

Described herein are improved methods and means for lubrication during diametral mandrel expansion of hollow couplings at cryogenic temperatures, the couplings being formed of a metal susceptible to the impartation of dimensional heat recoverability by deformation at a temperature below that at which the material undergoes a martensitic transformation. Films or fibrilous cloths of organic material are disposed between the interior wall of the part and the mandrel, the material being such as to undergo plastic deformation at the temperatures and pressures obtained during forcible expansion of the fitting internal diameter of from about 3 to about 9 percent, in order to provide roller bearing lubrication. Preferred lubricant materials are polyethylene and related linear polymers and waxes and fluorocarbon oligomers. The couplings may be formed of titanium-nickel or beta-copper alloys, stainless steels and the like.

12 Claims, 13 Drawing Figures

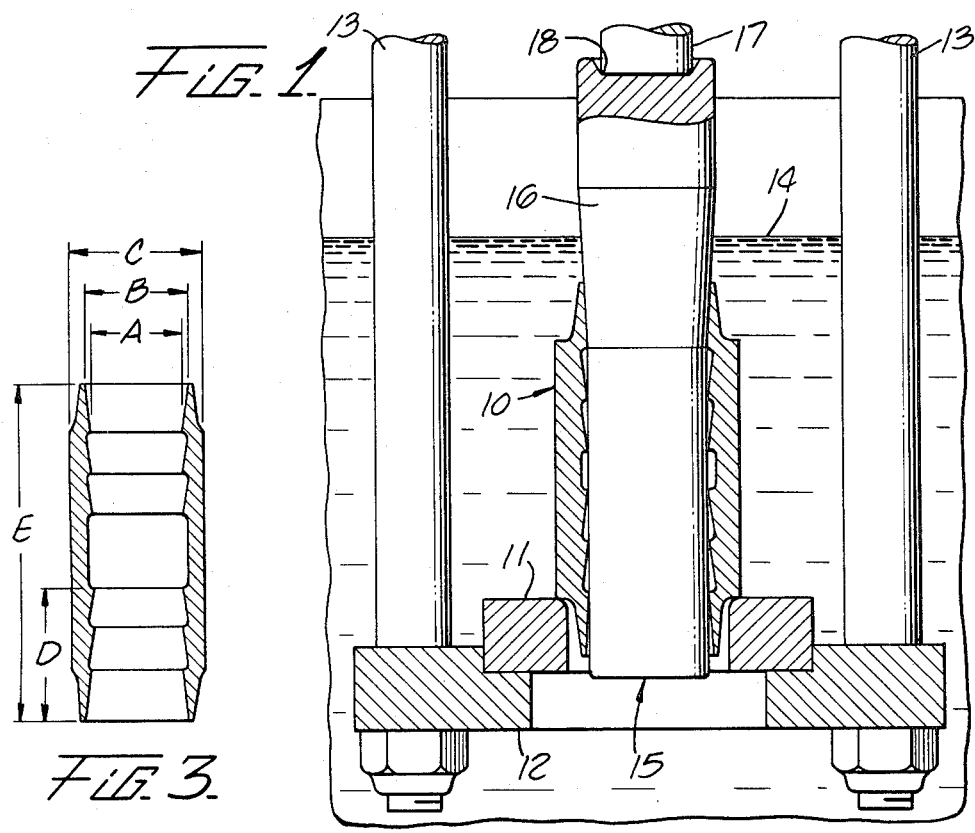
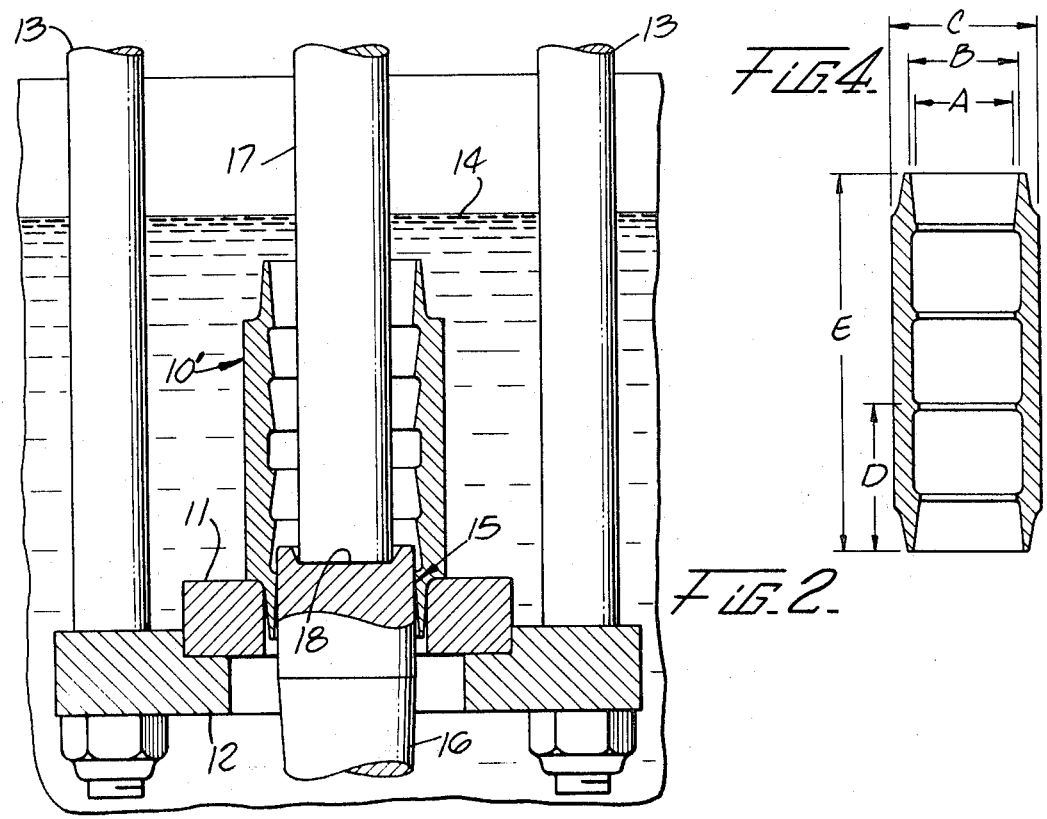

METHOD FOR CRYOGENIC MANDREL EXPANSION

CROSS-REFERENCE RO RELATED APPLICATION

This application is related to the concurrently filed application of Edward C. Stivers et al., Ser. No. 178,333.

BACKGROUND OF THE INVENTION

1. Field of the Invention

This invention relates to pipe couplings and the like which are diametrally expanded at cryogenic temperatures by passing a mandrel therethrough such that upon warming to higher temperatures the coupling contracts in diameter, as about the ends of pipes which may be joined thereby. More particularly, this invention relates to methods and means for lubricating the mandrel-coupling interface during low temperature mandrel expansion.

2. Description of the Prior Art

Heat recoverable materials, i.e., those which dimensionally recover from a heat unstable configuration to a heat stable configuration upon the application of heat alone have previously enjoyed wide attention in diverse applications. Various alloys of titanium and nickel have heretofore been disclosed as susceptible to the impartation of heat recoverability by dimensional deformation at a temperature in which the metal exists in its martensitic state. When an article comprised of metal which has been so deformed to enlarge some dimension thereof warms above a transition temperature to a temperature in which the metal exists in the austenitic state, the article contracts to a size substantially no greater than that it enjoyed prior to expansion. Examples of such alloys may be found in U. S. Pat. Nos. 3,174,851 and 3,351,463, the article by Goldstein, Buehler and Wiley entitled "Effects of Alloying upon certain properties of 55.1 Nitinol" (published Aug., 1965 by U.S. Naval Ordnance Laboratory, White Oak, Maryland as NOLTR 64–235), U. S. Pat. application Ser. No. 53,112 of Harrison, Choi and Marchant filed July 2, 1970 for Heat Recoverable Alloy, and U. S. Pat. application Ser. No. 852,722 filed July 2, 1970 by Harrison and Jervis for Heat Recoverable Metallic Couplings, now abandoned. The content of these materials is expressly incorporated herein to illuminate the background of this invention. The property of heat recoverability has not, however, been solely confined to such alloys. Thus, for example, various beta-copper alloys have been demonstrated to exhibit this property in, e.g., N. Nakanshi et al. *Scripta Metallurgica* 5, 433–440 (Pergamon Press, 1971) and such materials may be changed somewhat in composition to lower their transition temperatures to cryogenic regimes by known techniques. Similarly, 304 stainless steels have been shown to enjoy such characteristics. E. Enami et al., Id. at pp. 663–68. These disclosures are similarly incorporated herein by reference.

Advantage has been taken of this property of heat recoverability to fabricate cylindrical pipe couplings and the like which, after diametral expansion at low temperatures and warming to above a transition temperature, shrink with great force about pipe or tubing ends which have been disposed therein, forming a pressure tight joint. In the aforesaid Harrison and Jervis application and in the fabrication of other such recoverable couplings, the couplings have been cooled below their transition temperature and expanded by forcing a mandrel through them, the mandrel tapering outwardly to a transverse dimension greater than the original internal diameter of the coupling. Substantial difficulties have been encountered in performing this expansion operation, owing to a number of related factors. First, titanium alloys are known to exhibit high seizing and galling characteristics against hardened steel surfaces such as those of the expansion mandrels most commonly employed. Stainless steels are notorious for poor lubricity, and even the beta-brass alloys may be damaged by the enormous forces involved in diametral expansion. Such fittings are serially expanded by tapered mandrels, so that the axial force of the mandrel is translated into a normal force bearing at a particular point of time on but a portion of the coupling's interior wall. This condition is exacerbated in the common instance where the interior of the coupling has been provided with a plurality of radial teeth for gripping upon contraction, so that for all intents and purposes the mandrel is in line contact with the fitting during expansion. In the case of some titanium-nickel alloys a yield point is attained early in expansion (e.g., 1–2 percent diametral expansion) at about 7,000–8,000 psi. An expansion continues and work hardening effects come into play, the slope of the stress-strain curve rises sharply to a second yield point (usually at about 8–9 percent diametral expansion) which may be as high in order of magnitude as 100,000 psi. Very large normal forces are required to create such hoop stresses, and as the coupling is serially expanded by the tapered expansion mandrel these forces are imposed in turn upon the individual teeth of the part. Damage to the teeth frequently results from inadequate lubrication of the mandrel-coupling interface, as well as galling and scratching sufficiently severe as to impair the ability of the coupling to form a gas-tight joint in service. Moreover, poor lubrication can halt the advance of the mandrel, causing it to shatter or to become inextricably frozen in the coupling. Lubrication problems imposed by the great forces involved in mandrel expansion are compounded by the cryogenic regime in which the operation is carried out; the most common medium being liquid nitrogen, which boils at −196° C. Such considerations are serious impediments to adaptation to teachings directed to high temperature mandrel extrusions and expansions (e.g., respectively U.S. Pat. Nos. 3,127,015 and 3,078,905).

Attempts have been made to remedy these difficulties by interposing an aluminum sleeve between the hollow part and expansion mandrel, but such sleeves frequently are formed to the radial teeth of the part and cannot be removed after expansion. Collapsible collets have proved similarly unavailing. Limited success has resulted when $MoS_2$ in phenolic binder (a common cryogenic lubricant in other applications) has been baked onto the mandrel. However, this expedient creates difficulties of its own, because the expanded mandrel retains a substantial interior coating of the lubricant, which must be scrubbed out while the part is maintained below its transition temperature, as by immersion in liquid nitrogen. Otherwise, retained lubricant diminishes frictional engagement with pipes in end use application of the coupling, and may contaminate hydraulic fluids carried by the piping.

It will be apparent from the foregoing that a need has existed for provision of adequate methods and means of lubrication in cryogenic mandrel expansion operations.

BRIEF SUMMARY OF THE INVENTION

According to this invention, there are provided methods and means for diametral expansion of hollow cylindrical couplings formed of metals susceptible to the impartation of heat recoverability by mandrel expansion at cryogenic temperatures. Films or fibrilous cloths of organic material plastically deformable under conditions of expansion to provide roller bearing lubrication are disposed between the mandrel and the interior wall of the coupling prior to expansion. The lubricant materials are facilely applied, leave little residue on the expanded part, and compared to methods heretofore employed substantially diminish the loss rate of parts undergoing expansion. These and other objects and advantages of the invention will become apparent from the detailed description which follows and from the attached drawing (not to scale) in which like reference numerals refer to like elements and from the accompanying photomicrographs.

FIGS. 1 and 2 are partially sectioned elevations which respectively sequentially illustrate one manner by which the property of heat recoverability may be imparted to couplings according to the invention;

FIGS. 3 and 4 illustrate in section two couplings with which the present invention may be employed.

DETAILED DESCRIPTION OF THE INVENTION

Figure 5:
FIGS. 5 – 13 are electron scanning photomicrographs of the ramp portion of mandrel surfaces, variously depicting the surface prior to and after expansions or expansion attempts with particular materials.

With reference first to FIGS. 1 and 2, an expansible cylindrical coupling 10 formed of a suitable alloy rests on collar support 11, which is in turn replaceably supported in an annular recess in platform 12. Legs 13 suspend this assembly in a suitable cryogenic fluid 14 such as liquid nitrogen so that part 10 is entirely immersed therein. A tapered expansion mandrel 15 is disposed in part 10 so as to bring the upper portion of the coupling into engagement with the tapered portion or ramp 16 of the mandrel. The leading end of a pusher rod 17 is received in recess 18 in the after end of mandrel 15, the after end of rod 17 being fixedly mounted on the forward end of a hydraulically powered ram (not shown). Upon appropriate activation of the ram, mandrel 15 is forced downwardly by the axial force imposed thereon by rod 17. The radial components of that force emanent from ramp 16 occasion hoop stress in part 10, to which the part expansibly yields as mandrel 15 is forced therethrough. In FIG. 2, coupling 10' is shown as having expanded to accomodate the greatest diameter of mandrel 15 (by which mandrel size is hereafter characterized), while the mandrel itself is about to pass entirely through the coupling, falling into the container for fluid 14 and freeing part 10' for retrieval and use.

In practice, the coupling seam retains the entirety of expansive deformation forced upon it, instead springing elastically back to some extent, e.g., about ½ – 1 percent, as it clears the mandrel. Unless otherwise specified herein, however, by reference to percent diametral expansion is meant that percentage of enlargement necessary to accommodate the largest diameter of the mandrel passing through the part, without reference to elastic springback. Broadly, that diametral increase will range from about 3 to about 9 percent, affording expansion after springback of from about 2,½ to about 8 percent. Preferably, initial expansion is from about 7 to 9 percent, affording retained diametral increase of from about 6 to 8 percent. On the average, retained diametral expansion is from about 3½ to 4 percent.

Now, in light of the foregoing discussion of the prior art, the lubrication problems presented by such expansions will be immediately apparent from FIGS. 1 and 2. It has now been discovered that these potential difficulties may be side-stepped by resort to especial types of materials far more commonplace than $MoS_2$ and other exotic materials previously much vaunted in cryogenic applications. More specifically, it has been discovered that many organic materials are, under the conditions of such expansions, capable of plastically deforming to provide lubrication akin to the ease of travel associated with roller bearings.

Now, in conventional applications polymeric lubricant films and suchlike (e.g., Teflon coatings on kitchen utensils) overcome Coulomb frictional forces by reason of their low coefficients of friction. However, under the stupendous normal forces imposed on lubricant films in course of mandrel expansion, even materials of low frictional coefficients can give rise to unduly large frictional restraint. In any case, as those forces increase, the lubricant film can be destroyed, whereupon coefficients of friction become meaningless and other mechanisms come into play. It now appears that by judicious choice of materials the lubricant interposed between mandrel and coupling can plastically deform, even in the cryogenic environment obtaining, and provide roller bearing-type lubrication. While it is not intended that this invention be limited to such mechanistic considerations in the specific embodiments thereof, the foregoing discussion is borne out by the photomicrographs which accompany this specification as FIGS. 5 to 13.

Figure 6:
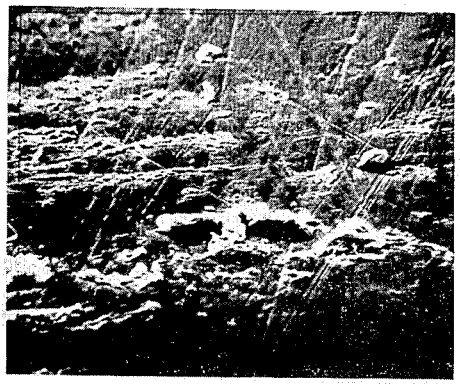
Figure 7:
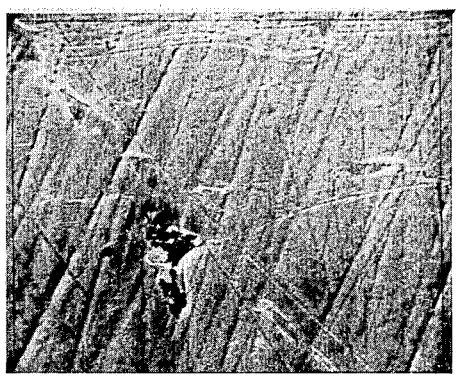
Figure 8:
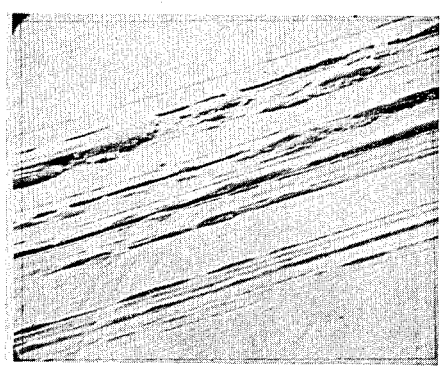
Figure 9:
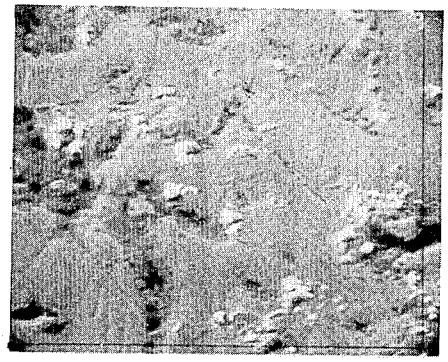
Figure 10:
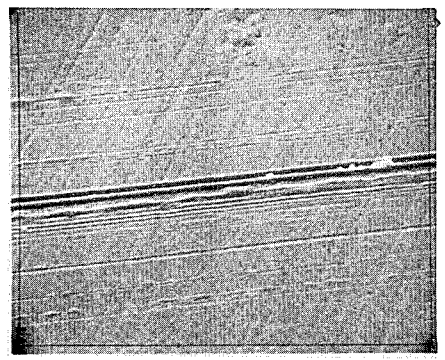
Figure 11:
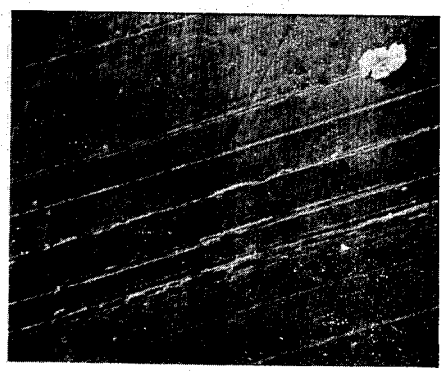
Figure 12:
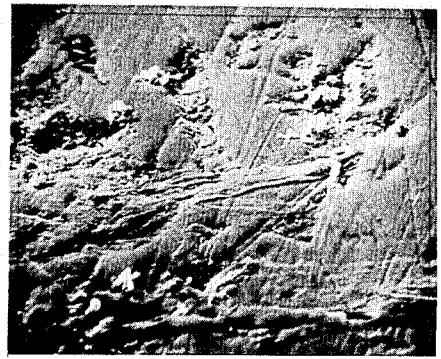
Figure 13:
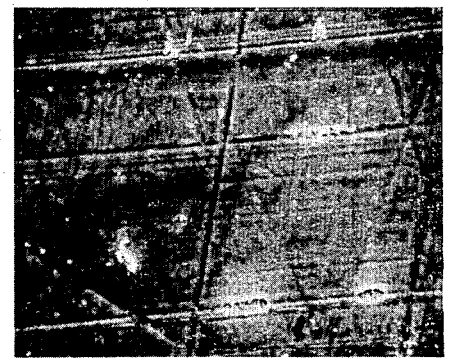

Mandrels freshly coated or used in expansions or expansion attempts and intended for scanning were transported while ensuring the ramp areas thereof were untouched by foreign objects. Mounting screws in the ends of the mandrels permitted the mandrels to be rotated about their long axes during deposition of thin gold coatings. The mandrels were then examined using a Materials Analysis Company electron scanning microscope. The mandrels were so mounted as to permit scanning along a distance of 1 inch in either direction from the middle of the ramp portion and in an arc of about 90° about the circumference. This area was scanned at 500 × and Polaroid pictures (Type 52 film) taken of appropriate features either at that magnification (FIGS. 5, 11 and 12), at 1000 × (FIGS. 6–7, 9–10 and 13) or at 2000 × (FIG. 8). In all micrographs, the score marks generally running from bottom to top are those resulting from surface finishing operations prior to use. FIGS. 7, 9 and 12 respectively depict the mandrels after dip coating with Kynar ($PVF_2$) solution, Chevron 160/165 petroleum wax solution and aliphatic polyketone solution. The remaining micrographs depict the mandrel following expansion, viz: FIG. 5, Tyvek solution; FIG. 6, after expansion with Tyvek cloth interposed between ramp and coupling; FIG. 8,, Kynar solution, FIG. 10, Chevron wax; or after an expansion attempt, viz: FIG. 11, polystyrene; and FIG. 13, the polyketone.

All pictured mandrels (save that used with Tyvek cloth in FIG. 6) were dip-coated with 0.5 percent wt. solutions of the particular lubricant candidate, the mandrel being at room temperature and the solution being that stated for the material in Table III, infra (in the case of Tyvek solution, xylene at 138° C). It will be observed that each micrograph taken following expansion reveals parallel lines running generally from side to side along the length of the mandrel in the direction of expansion. In the successful expansions (FIGS. 5, 6, 8 and 10) these lines appear to consist of ridges of organic material and in the case of the wax expansion this observation was reinforced because when the electron beam was sharply condensed on such ridges, the ridges disappeared due to melting and vaporization in the instrument vacuum.

In the case of the aborted attempts with polystyrene and the polyketone, however, the lines are observed to be carved into the mandrel surface as if very hard particles had been caught between mandrel and one or more of the coupling's radial teeth and dragged along.

Now, where the lubricant material is fibrilous as first disposed between mandrel and coupling (as is the case where Tyvek spun bonded polyethylene or other fibrilous cloth of suitable material is employed), or where the lubricant is deposited in particulate form (viz, the oligomers and suspensoids discussed infra), then the Coulomb mechanism will play little part in overcoming frictional restraints. The similar case should obtain with respect to otherwise suitable materials which ruggedly deposit on the mandrel and, embrittled by the cryogenic environment which initially controls, are fragmented early in the course of mandrel intrusion into the coupling. However, as to those suitable materials which form relatively smooth films when applied, e.g., to the mandrel, low coefficients of friction can be important in facilitating mandrel advance to that point of the expansion where frictional forces disrupt the film to afford roller bearing lubrication by dint of plastic deformation of the lubricant. Generally, smooth film-forming organic materials having room temperature coefficients of friction less than about 0.4 and which plastically deform during marked increase in the expansion forces are suitable to this end.

The hostile environment in which the present invention is practiced understandably makes difficult assured prediction of all those materials optimal in use. The diverse trials referred to hereafter, however, have given rise to useful criteria of selection (see infra). In any case, once given the concept of the invention and in light of this disclosure, a suitable number of alternatively appropriate materials can be readily generated by straightforward and routine testing, i.e., expansion mandrels are simply dip-coated with a candidate material and forced through a coupling.

All of the materials containing aromatic moieties in the polymer backbone or pendant therefrom which have been tested (e.g., aromatic polyketones and polyimides have proved unsatisfactory, possibly due to the known rigidifying tendency of such moieties. Tested materials categorizable as glossy, brittle low elongation polymers (e.g., polyvinyl-pyrollidone, polystyrene, aliphatic polyketone) have similarly not proved out. Films of materials which are rubbery at room temperature (Kraton, transpolyisoprene, and Nordel) appear unsatisfactory, possibly due in part to their characteristically greater coefficients of friction and to high internal cohesion which resists participation in the "roller-bearing" lubrication mechanism. On the other hand, polyethylene and like generally linear hydrocarbon polymers have proved quite satisfactory, and the same is true of related oligomers. Thus, polyethylene itself, polypropylene and polyethylene oxide provide suitable, as did a petroleum wax oligomerically related to polyethylene (Chevron wax). Carbowax, an ethylene oxide oligomer, should accordingly be suitable, as should microcrystalline waxes. As used herein, the term oligomer refers to linear organic materials ranging in molecular weight from about 500 to about 6000, whether obtained synthetically by chain-stopped polymerization or "naturally," as in the case of petroleum wax and jelly. The marginal performance of petroleum jelly relative to petroleum wax again suggests the significance of linearity, as the former is substantially more branched than the latter. Similarly, ethylene-vinyl acetate copolymer could be taken from trial results to suffer relative to polyethylene itself from inclusion of a minor portion of branched monomer. The failure of polyvinyl chloride recalls the notoriously poor lubricity of chlorinated species, although polychlorotrifluoroethylene marginally passed muster in the trial reported. The fluorinated materials tested generally performed satisfactorily, viz, polyvinylidene fluoride solution and suspension, and the fluorocarbon oligomers. While Teflon and polychlorotrifluoroethylene polymers have previously been employed as cryogenic lubricant materials, as in ball race lubrication, etc., it could not have been predicted prior to this time that the same or similar materials would find application in the very high pressure regimes obtaining in mandrel expansion, especially where in the latter case the mechanism of action appears to differ significantly from that normally associated with fluorocarbon lubrication.

Of course, no film disruption or mechanism transition from Coulomb controls where, in lieu of a lubricant film on the mandrel there is employed a fibrilous cloth of a suitable lubricant material. "Fibrilous," as used herein, refers simply to the characteristic loosely entangled polymeric fibers (whether woven or nonwoven) which distinguish cloth as such from unadhered films, etc.

Where the fibrilous cloth is employed, it may be disposed about the tapered portion of the expansion mandrel before the same is inserted in the coupling to be expanded. Alternatively, of course, the coupling may be lined with the cloth prior to insertion of the tapered mandrel therein.

While emphasis to this point has been laid upon mandrel-coupling interface lubrication by the provision of either an interposed fibrilous cloth or a suitable coating on the mandrel, it will be understood that the interior surfaces of the coupling can be lubricant-coated as well. Where both coupling and mandrel are coated, no difference in lubrication properties has been observed. In the case where the coupling is provided with interior radial teeth, it is recommended that reliance not be placed solely upon coating of the coupling, as here but little of the lubricant coating will likely see the mandrel, i.e., that on the teeth themselves. On the other hand, where the mandrel is lubricant-coated, essentially all of the lubricant coat can be expected to come into play. Of course, one object of the invention is to diminish the quantum of lubricant retained in the coupling following expansion, and it is believed that end is best served by coating the mandrel alone.

In addition to the Grafmo and SAE 1045 steels employed in the trials reported in Table IV, infra, there may be mentioned as suitable materials for mandrel fabrication SAE 1042 mild steel and maraging varieties, although the latter steel is somewhat expensive and by reason of its nickel content can encourage galling when employed with titanium-nickel parts. Other suitable mandrel materials will be apparent to those skilled in the metallurgical arts to which the present invention pertains.

The formed mandrels are desirably surface hardened, as by heating to red and quenching in oil or water, or more advantageously by case hardening to, e.g., Rockwell C 58-63. Before coating or other expansion employment the mandrel surface is preferably finished to high polish, e.g. No. 16 RMS, with 600 grit sandpaper or the like.

Where the lubricant is coated onto the mandrel itself, suspensions or solutions containing on the order of about 0.5 percent by weight lubricant have been found to deposit optimal amounts of lubricant in vertical dip application. Obviously, unduly low amounts of lubricant diminish ease of mandrel passage, while unduly great amounts tend by reason of internal cohesion to unduly forestall the film disruption which marks the transition from coulomb to roller bearing lubrication mechanisms in the case of smooth film-forming lubricant materials. Generally, coating thickness of from about 2 to 50 microns to suitably contribute to the goal of smooth, continuous transition from one mechanism to the other.

Among the alloys preferred in the practice of the invention may be mentioned those which appear in Table I, below, in which the percentages are atomic percentages and are approximate:

TABLE I

| No. 1 | Titanium 50 | Nickel 47 | Iron 3 |
| No. 2 | Titanium 49.25-49.00 | Nickel 50 | Aluminum .75-1.00 |
| No. 3 | Titanium 48.5 | Nickel 51.5 | |
| No. 4 | Titanium 50 | Nickel 48 | Manganese 2 |

All of these alloys have a transition temperature below −75°C yet above −196°C, suiting them both for normal end use applications and for expansion in liquid nitrogen (b.p.−196°C), the preferred cryogenic fluid. It should be understood that the transition temperature may be a temperature range, and a hysteris usually occurs which causes the precise temperature at which a transition takes place to depend on whether the temperature is rising or falling. Further, the transition temperature is a function of the stress applied to the material, the temperature rising with increasing stress. As used herein, "cryogenic fluid" refers to those fluids boiling below about −20°C. It will be appreciated that the cryogenic fluid employed must be paired to the transition point of the alloy contemplated for expansion to permit importation of heat recoverability, and that with this in mind appropriate selections may be made from a wide range of materials, i.e., liquid nitrogen, hydrogen, helium, propane, methane, etc. Liquid nitrogen is preferred from the standpoint of availability, boiling point and relative safety.

In the following examples, various materials are tested for lubricant capability on ½, ¼ and ⅜ inch couplings machined from blanks composed of the ternary alloy Ti:Ni:Fe::50:47:3 in which the percentages are atomic percentages and are approximate. Unless otherwise noted, the ½ and ⅜ inch parts were configured as in FIG. 3 and the ¼ inch parts as in FIG. 4 and exhibited the following dimensions with reference to those figures:

TABLE II

| | Dimensions 1, 2, 3 (inches) | | | | | | | | | | |
|---|---|---|---|---|---|---|---|---|---|---|---|
| | A dia. | | | B dia. | | C dia. | | D typ. | | E | |
| Size | 1 | 2 | 3 | 1 | 3 | 1 | 3 | 1 | 3 | 1 | 3 |
| ⅜ | 0.358 | 0.381 | 0.358 | 0.372 | 0.372 | 0.483 | 0.483 | 0.427 | 0.426 | 1.030 | 1.029 |
|  | .364 | (min) | .367 | .377 | .380 | .488 | .490 | .437 | .438 | 1.040 | 1.041 |
| ½ | .478 | .508 | .478 | .497 | .497 | .647 | .647 | .545 | .544 | 1.290 | 1.289 |
|  | .484 | (min) | .487 | .502 | .505 | .652 | .654 | .555 | .556 | 1.300 | 1.301 |
| ¼ | .237 | .255 | .237 | .246 | .246 | .345 | .345 | .340 | .339 | 0.895 | 0.394 |
|  | .240 | (min) | .242 | .250 | .252 | .350 | .352 | .350 | .351 | .905 | .907 |

1 — As machined.
2 — Expanded.
3 — Recovered (unrestricted).

The mandrels (respectively, Types 1 and 2) employed in testing were variously formed of: "Grafmo," a graphite-containing tool steel available from Jurgensen Steel (AISI06) and containing C 1.45; Mn 1.00; Si 1.25 max; and Mo 0.25 or SAE 1045 mild carbon steel and tapered about 1.5° to maximum diameter over a portion of their length equal to about one-half the length of the part intended for expansion. The mandrels were hardened by heating to red and quenching in oil or water, then lightly buffed with 400 or 600 grit sandpaper and washed in boiling xylene and/or n-heptane. The mandrels were coated by vertical dipping, either at room or elevated temperature in a warm solution or suspension of the lubricant candidate, then air dried. Fluorocarbon oligomer release agents were sprayed on as a light coating. Table III identifies the lubricant candidates tested and solvent and solution temperatures employed with particular lubricant materials.

The coated mandrels were then employed to expand parts of various sizes in liquid nitrogen, a hydraulic ram-activated plunger like that shown in FIGS. 1 and 2 being used to force the mandrel through the cylindrical fitting. The pressure readings reported are those imposed on the ram piston (area 3.14 in.²) so that, e.g., axial force on a mandrel approximately one square inch in cross-sectional area would be somewhat more than three times the recorded pressure. Of course, as before noted, the radial forces imposed on the coupling itself are far greater, by reason of the line contact between mandrel and coupling during expansion.

600 psi piston pressure, most preferably less than about 300–350 psi. Generally, materials requiring more than 750 psi ram piston pressure using ⅜ inch mandrels are deemed unsatisfactory, based on the limited trials reported.

Attempts were "aborted" where the creaking and groaning noises became excessive, when using ⅜ inch

TABLE III

| Lubricant No. | Lubricant candidate | Remarks | Solvent | Solution temp. (°C) |
|---|---|---|---|---|
| 1a | Tyvek solution | High density polyethylene spunbonded cloth, DuPont | Xylene | 120 |
| 1b | Tyvek solution | do | do | 138 |
| 2 | Marlex 6003 | Polyethylene, m.p. 134°C, M.I. 0.3, Phillips Petroleum | do | 120 |
| 3 | DYNH | Branched, low density polyethylene, Union Carbide Corp | do | 120 |
| 4 | Chevron 160/165 wax | Crystalline petroleum wax | do | 138 |
| 5 | Petroleum jelly | Semi-solid, m.w. 700–1000 | do | 120 |
| 6 | Ethylene-vinyl acetate copolymer | Elvax 460, 18% vinyl acetate, DuPont | do | 120 |
| 7 | Polyethylene oxide | Union Carbide Corp. WSRN 80 | Tetrachloroethylene | 75 |
| 8 | Polypropylene | Profax 6724 | Decalin | 165 |
| 9 | Vydax | Fluorocarbon oligomer, DuPont | (Aerosol spray) | 25 |
| 10 | GS-3 | Fluorocarbon oligomer, Ram Chem. Corp | do | 25 |
| 11 | Polychlorotrifluoroethylene | do | Xylene | 138 |
| 12 | Nylon 6,10 | $\{NH-(CH_2)_6-NHCO-(CH_2)_8-CO\}_n$, Zytel 33 | m-Cresol | 120–130 |
| 13 | Nylon 12 | $\{NH-(CH_2)_{11}-CO\}_n$, Plascon 12 | do | 140 |
| 14 | Polyvinylidene fluoride solution | Kynar 455, Pennwalt Corp | Dimethylacetamide | 165 |
| 15 | Polyvinylidene fluoride suspension | Kynar 455, 5 micron powder | 2-butanone | 25 |
| 16 | Aromatic polyketone | Raychem Corp | $CLCF_2C(OH)_2CF_2CL$ | 25 |
| 17 | Polydodecamethylene pyromellitimide | Raychem Corp | m-cresol | 120 |
| 18 | Polytetramethylene terephthalate | Eastman Kodak 6PRO | do | 140 |
| 19 | Kraton 101 Block polymer | $\{(CHCH_2)_x\text{-}(CH_2-CH=CH-CH_2)_y\text{-}(CH_2-CH)_z\}_n$  $\phi$  $\phi$  Shell Chemical Corp. | Toluene | 109 |
| 20 | Transpolyisoprene | Polymer Corp. of America | do | 110 |
| 21 | Nordel 1145 | Ethylene-propylene terpolymer, DuPont | do | 110 |
| 22 | Polyvinylpyrrolidone | General Aniline & Film Corp. NP-K30 | Methanol | 50 |
| 23 | Polystyrene | Dow Chem. Corp., Styron 666 | Toluene | 110 |
| 24 | Polycaprolactone | Union Carbide PCL-700 | Acetone | 56 |
| 25 | Polyvinyl acetate | Union Carbide AYAA | Toluene | 100 |
| 26 | Polymethylmethacrylate | DuPont Elvacite 2010 | Xylene | 125 |
| 27 | Polyvinyl chloride | Geon 92 | Tetrahydrofuran | 60 |
| 28 | Viton AHV | $\{CH_2CF_2\}_x\text{-}(CF_2C(CF_3)F)_y$ | Dimethyl acetamide | 140 |

Those parts which were successfully expanded are subjected to quality control inspection, a generally subjective microscopic examination for severe galling, scratching sufficient to give rise to gas leaks in formed joints, excessive smearing of the radial teeth with which the part is provided, etc. The more important desideratum from the standpoint of quantitative assessment is the ram piston pressure reading, a measure of resistance to passage of the mandrel. Preferably, for example, ⅜ inch mandrels coated in 0.5 percent wt solutions of the lubricant candidate require less than or about mandrels expansion appeared to halt and gauge pressure exceeded 750 psi. "Marginally" successful attempts were those in which the part was successfully expanded, albeit at undesirably high piston pressure and with some acceptable galling or scratching. All dip-coating solutions and suspensions contained about 0.5 percent wt. lubricant unless otherwise indicated. Speed of mandrel advance was hand-controlled by pressure regulation to minimize liquid nitrogen bubbling adjacent the part. The data presented in Table IV was taken.

TABLE IV

| Run No. | Lubricant candidate | Part size (in.) | Mandrel dia. (in.) | Mandrel type | Expansion pressure (psi) | Quality control | Remarks |
|---|---|---|---|---|---|---|---|
| 1 | (1a) Tyvek soln | ⅜ | 0.390 | a1 | 250 | | Facile expansion. |
| 2 | Tyvek cloth | ⅜ | 0.390 | 1 | 400–600 | | |
| 3 | (1b) Tyvek soln | ¼ | .2605 | b2 | 50 | Accept | Slight smearing of teeth. |
| 4 | do | ⅜ | .390 | b1 | 200 | do | |
| 5 | do | ⅜ | .390 | b1 | 500 | Failed | .75% dipping solution. |
| 6 | (1a) Tyvek soln | ⅜ | .390 | b1 | > 1000 | Reject | Teeth obliterated, .25% dipping solution. |
| 7 | do | ⅜ | .390 | a1 | > 1000 | do | No expansion. |
| 8 | (1b) Tyvek soln | ½ | .517 | b1 | 250 | Accept | |
| 9 | Tyvek cloth | ⅜ | .390 | 1 | 50–100 | do | |
| 10 | (2) Marlex | ⅜ | .390 | a1 | 200–250 | do | |
| 11 | (3) DYNH | ⅜ | .390 | a1 | 200 | do | Very light scratching. |
| 12 | (4) Chevron wax | ⅜ | .390 | a1 | 400 | do | |
| 13 | do | ⅜ | .390 | b1 | 350–400 | do | |
| 14 | (5) Petro. jelly | ⅜ | .390 | a1 | 500–600 | do | |
| 15 | do | ⅜ | .390 | b1 | 700–750 | Marginal | |
| 16 | (6) Elvax | ⅜ | .390 | a1 | 250 | Reject | Facile expansion, but light galling. |
| 17 | (7) Polyox | ⅜ | .390 | b1 | 300 | Accept | |

TABLE IV—Continued

| Run No. | Lubricant candidate | Part size (in.) | Mandrel dia. (in.) | Mandrel type | Expansion pressure (psi) | Quality control | Remarks |
|---|---|---|---|---|---|---|---|
| 18 | (8) Polypropylene | 3/8 | .390 | a1 | 450–500 | ..... do ......... | |
| 19 | (9) Vydax | 3/8 | .390 | 1 | 300–350 | ..... do ......... | |
| 20 | (10) GS–3 | 3/8 | .390 | 1 | 250 | ..... do ......... | |
| 21 | (11) PCTFE | 3/8 | .390 | a1 | 250 | Reject ........ | Good expansion, but aesthetically objectionable light galling. |
| 22 | (12) Nylon | 3/8 | .390 | a1 | 200 | Failed ........ | Scratched. |
| 23 | (13) Nylon | 3/8 | .390 | a1 | 250 | ..... do ......... | Minor scratching. |
| 24 | (14) PVF$_2$ soln | 3/8 | .390 | b1 | 400–450 | Accept ....... | Cleaning required. |
| 25 | (15) PVF$_2$ suspension | 3/8 | .390 | b1 | 400 | ..... do ......... | Do. |
| 26 | (16) Polyketone | 3/8 | .390 | a1 | > 750 | ................... | Abort. |
| 27 | (17) Polyimide | 3/8 | .390 | a1 | > 750 | ................... | Do. |
| 28 | (18) PTMT | 3/8 | .390 | a1 | > 1000 | ................... | Do. |
| 29 | (19) Kraton | 3/8 | .390 | a1 | > 750 | ................... | Do. |
| 30 | (20) Polyisoprene | 3/8 | .390 | b1 | > 750 | ................... | Do. |
| 31 | (21) Nordel | 3/8 | .390 | b1 | > 750 | ................... | Do. |
| 32 | (22) PVP | 3/8 | .390 | b1 | > 750 | ................... | Do. |
| 33 | (23) Polystyrene | 3/8 | .390 | a1 | > 750 | ................... | Do. |
| 34 | (24) PCL | 3/8 | .390 | b1 | > 750 | ................... | Do. |
| 35 | (25) PVA | 3/8 | .390 | b1 | > 750 | ................... | Do. |
| 36 | (26) PVC | 3/8 | .390 | a1 | 1000 | Reject ........ | |
| 37 | (27) Viton | 3/8 | .390 | a1 | > 750 | ................... | Abort. | a Mandrels oven-heated to ≅ 120°C before dipping.
b Mandrels dipped at room temperature.

While the couplings have been characterized as cylindrical, it will be appreciated that in the preferred configurations depicted in FIGS. 1–4 this is only generally so, e.g., the end portions of the couplings are tapered, the coupling is preferably supplied with radial teeth on the inner surface thereof, etc. Moreover, while the couplings employed are generally right cylindrical in configuration, it will be understood that they may be otherwise configured, e.g., oblate in lateral cross-section, etc.

The invention has been described with reference to the preferred embodiments thereof but is should be understood that the invention is not limited thereto but only to the lawful scope of the appended claims.

I claim:

1. In a method for diametrically expanding a hollow, generally cylindrical coupling formed of a metal susceptible to the impartation of heat recoverability, comprising the steps of immersing the coupling in a cryogenic liquid boiling below a temperature at which the metal undergoes a martensitic transformation and forcing a tapered expansion mandrel, having a diameter from about 3 to about 9 percent greater than the unexpanded internal diameter of the coupling, through said coupling the improvement comprising disposing between the internal surface of the coupling and the tapered portion of the mandrel an organic material capable of plastic deformation under the force to which it is subjected as the mandrel passes through the coupling in said liquid, thereby providing roller bearing lubrication at the mandrel-coupling interface.

2. A method according to claim 1 wherein the internal surface of the hollow coupling is provided with a plurality of radial teeth.

3. A method according to claim 2 wherein said organic material is in the form of a fibrilous cloth.

4. A method according to claim 2 wherein said cryogenic liquid is liquid nitrogen and wherein said transition point is less than about −75°C but above about −196°C.

5. A method according to claim 3 wherein said cryogenic liquid is liquid nitrogen and wherein said transition point is less than about −75°C but above about −196°C.

6. A method according to claim 1 wherein said organic material is a polyethylene.

7. A method according to claim 2 wherein said organic material is a polyethylene.

8. A method according to claim 3 wherein said organic material is a polyethylene.

9. A method according to claim 5 wherein said organic material is a polyethylene.

10. A method according to claim 3 wherein said cloth is wrapped about the tapered portion of said mandrel before insertion thereof into said coupling.

11. A method according to claim 3 wherein the interior of said coupling is lined with said cloth before insertion of the tapered portion of said mandrel therein.

12. A method according to claim 3 wherein said cloth is a high density polyethylene spun bonded cloth.

* * * * *